April 21, 1953     F. TVRZICKY     2,635,334
SCRAPING AND SHAVING DEVICE
Filed April 27, 1950
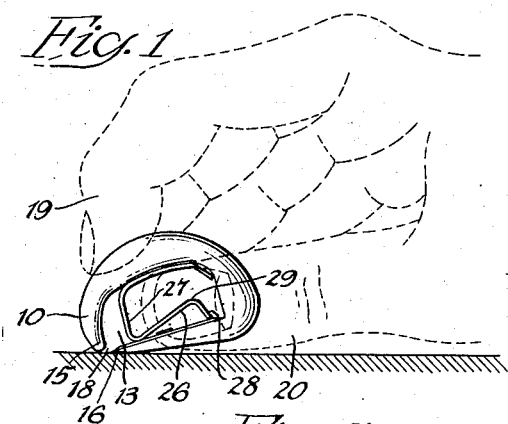
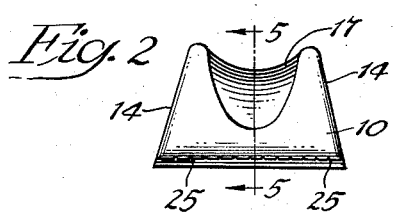
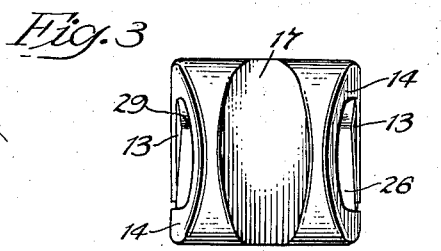
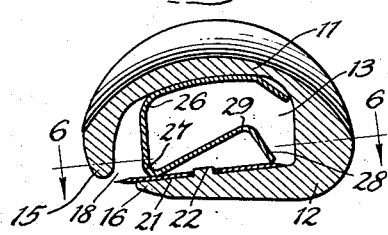
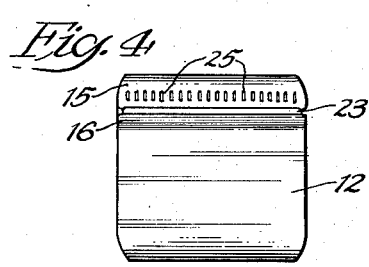
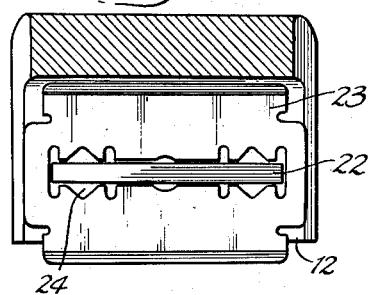
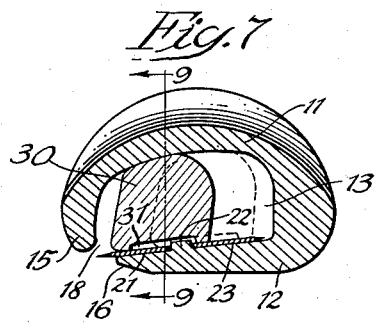
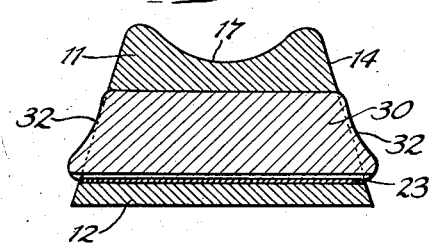
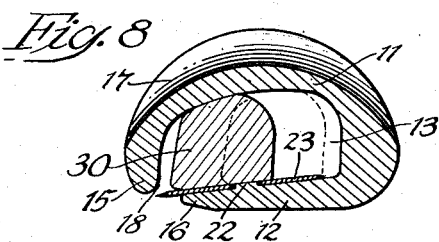
Inventor
Francis Tvrzicky
By John F. Brezina
Atty.

Patented Apr. 21, 1953

2,635,334

UNITED STATES PATENT OFFICE 2,635,334

SCRAPING AND SHAVING DEVICE

Francis Tvrzicky, Chicago, Ill.

Application April 27, 1950, Serial No. 158,558

3 Claims. (Cl. 30—169)

My invention relates to a device for shaving and scraping and more particularly to a novel scraping and shaving device which is adapted for manual use eliminating the hazard of holding a cutting blade. It is an object of my invention to provide a shaving device in which an ordinary razor blade may be used to provide the scraping and shaving element. It is a further object of my invention to provide a holding element which is constructed to preclude injury by providing a housing in which the cutting element may be held and protecting the operator or user. Additionally, it is an object of my device to provide in combination a housing adapted to hold a cutting element and simultaneously protecting the user, and having a blade impinging element which is releasable to permit renewal or change of the shaving and scraping element.

It is a further object of my invention to provide a device for cutting and scraping in which the cutting or scraping element is retained in the housing or shell wherein the shell or housing is provided with depressions to thereby permit the housing to be gripped manually so that the maximum efficiency and control of the cutting and scraping element can be attained. It is a further object of my invention to provide a novel housing for releasably holding a scraping element, such as a blade, which is adapted to be manually controlled and which is adapted to be held in a variety of positions so that great efficiency can be achieved with the use of my novel device.

Other and further objects of my invention will become apparent from the following description and appended claims, reference being had to the accompanying drawings and numerals of reference thereon.

On the drawings:

Fig. 1 is a side elevation of my device illustrating the same in positions of use and showing in dotted lines the hand of an operator.

Fig. 2 is a front elevation of my device.

Fig. 3 is a top plan view of my device.

Fig. 4 is a bottom plan view of my device.

Fig. 5 is a view of my device taken substantially on the line 5—5 of Fig. 2 and looking in the direction of the arrows.

Fig. 6 is a view of my device taken substantially on the line 6—6 of Fig. 5 and looking in the direction of the arrows, the spring not being shown in this view.

Fig. 7 is a cross-sectional view of my device, taken on a vertical plane, showing a modified means for releasably holding the cutting element.

Fig. 8 is a cross-sectional view of my novel device, taken on a vertical plane and illustrating further modification of the means for releasably retaining the cutting element.

Fig. 9 is a view taken substantially on the line 9—9 of Fig. 7 and looking in the direction of the arrows.

Referring to the drawings, numeral 10 designates an outer shell, covering or housing which has an arcuately extending upper portion 11 which merges at the back side, which is opposite the slot into a substantially straight lower portion 12 as illustrated in Figs. 5, 7, 8 and 9. The shell 10 has side openings 13 which are seen in elevation in Figs. 1, 5, 7 and 8 and which are seen from above in Fig. 3.

The shell 10 has a pair of oppositely sloping sides 14 which converge upwardly and diverge downwardly. An elongated slot or opening 18 is formed at the normally front end of the device between the lip 15, which is the terminal end of the upper portion of shell 10, and the lip 16 which is at the front terminus of the lower portion 12 of shell 10 and which is spaced from lip 15.

In order to facilitate the gripping of the shell or housing 10 an arcuately extending depression, recess or groove 17 is provided in the upper portion 11 of the shell 10 and which extends from the front to the rear of the housing 10 as illustrated in Figs. 2, 5, 7, 8 and 9.

By referring to Fig. 1, the preferred relative position which the hand of an operator or user assumes when using the device will be noted. Note that the forefinger 19 extends into the groove 17, that the thumb 20 engages one of the sloping sides 14 and that any of the remaining fingers, preferably the finger adjacent the index finger, engages the opposite of sides 14.

A substantially flat inner face 21 limits the lower portion 12 of the shell 10. Extending upwardly from the face 21 is a transverse rib, ridge or projection 22 which is integral with the housing or shell 10. A cutting element such as a razor blade or the like 23 is releasably secured within the shell 10 so that its cutting and shaving edge projects into aperture 18 between lips 15 and 16, the lower flat face of the razor blade being in abutment with the face 21 of the shell 10. It will be noted, by referring to Fig. 6 that the cutting element or razor blade 23 has the usual transversely extending slot designated as 24 into which the ridge or rib 22 extends to limit undesirable movement of the blade 23. Optionally, the height of the projection or rib 22 may be equal to or be greater than the thickness of the blade or cutting element 23. In Fig. 8, I have illustrated the projection or rib 22 being equivalent to the thickness of the blade 23.

In order to permit passage of shavings, I provide a plurality of adjacent slots, grooves or passages, some of which are numbered 25 in Figs. 2 and 4, said passages 25 being in the lower end of the lip 15.

To releasably retain the blade or cutting elements 23, as illustrated in Figs. 1, 3 and 5, I employ a curved tension spring 26 whose upper portion is in substantial abutment with the inner surface of portion 11 of the shell 10. The lower portion of spring 26 is bent to provide engagement of the blade 23 with the lower forward end 27 of the spring 26 and the rearward lower end 28 of the spring 26. The bending of the spring is such that an intermediate portion 29 is elevated from the blade 23 to permit manual compression of the spring whereby blade 23 may be removably inserted.

In the modified form of my invention illustrated in Figs. 7, 8 and 9, a block or wedge 30 may be optionally employed to releasably retain the blade 23. It will be noted that the height of the space within shell 10 is smaller at the forward end than at the rearward end, the height of said space gradually increasing from front to rear. Therefore, by moving the wedge or block 30 to the dotted line positions indicated in Figs. 7 and 8, I release the securing pressure holding the blade when the block 30 is in the position indicated in solid lines in Figs. 7 and 8. If the form of my invention having a projecting ridge 22, as illustrated in Fig. 7, is employed, the wedge or block 30 may have an elongated transverse slot 31 to permit movement of the wedge 30. The block 30 optionally may have suitable curved depressed side ends 32 which provide convenient finger rests or grips for the thumb and second finger. By the closeness of the point of application of the manual force, I am able to easily control the cutting or shaving operation.

It will readily be appreciated that the particular form of the element for releasably retaining the razor blade 23 is immaterial as long as it performs a function equivalent to that embraced by the concept herein disclosed. For example, a wedge 30 may adopt a plurality of forms being hollow or even open-ended as convenience or expediency directs.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:
1. In a device for releasably retaining a razor blade or the like comprising, an open-ended, substantially C-shaped shell, the marginal edges of said shell being spaced from each other to form a slot along one side of said shell, the interior of said shell serving as a blade-receiving cavity and being partially defined by a top surface and a substantially flat bottom surface adapted to support a blade having an edge disposed in said slot; said surfaces converging toward said slot side of said shell; and a wedge-shaped block positioned within said cavity and engageable with said top surface and the blade, said block being slideable toward said slot side of said shell to releasably clamp the blade on said bottom surface, the ends of said block extending from the open ends of said shell and being provided with depressions to facilitate gripping thereof.

2. In a device for releasably retaining a razor blade or the like comprising, an open-ended, substantially C-shaped shell, the marginal edges of said shell being spaced from each other to form a slot along one side of said shell, the interior of said shell serving as a razor blade-receiving cavity and being partially defined by top and bottom surfaces, said surfaces lying substantially in planes converging toward said slot side of said shell; a ridge projecting normally from said bottom surface and being spaced from and parallel to said slot, said ridge being adapted to extend through the central opening of a razor blade adapted to be supported on said bottom surface to position one edge of the blade in said slot; and a wedge-shaped block positioned within said cavity and engageable with said top surface and the razor blade, said block being slideable toward said slot side of said shell to releasably clamp the razor blade on said bottom surface.

3. The device as set forth in claim 2, in which the ends of said block extend from the open ends of said shell and are provided with depressions to facilitate gripping thereof.

FRANCIS TVRZICKY.

References Cited in the file of this patent

UNITED STATES PATENTS

| Number | Name | Date |
|---|---|---|
| 809,690 | Hunt | Jan. 9, 1906 |
| 1,022,623 | Dunn | Apr. 9, 1912 |
| 1,643,757 | Wallenbeck | Sept. 27, 1927 |
| 2,198,530 | Francis | Apr. 23, 1940 |
| 2,245,096 | Penney | June 10, 1941 |
| 2,476,288 | Dercole | July 19, 1949 |
| 2,549,542 | Stair | Apr. 17, 1951 |